US012632414B2

(12) United States Patent
Rin

(10) Patent No.: US 12,632,414 B2
(45) Date of Patent: *May 19, 2026

(54) SYSTEM INCLUDING FIRST SERVER AND SECOND SERVER FOR TRANSMITTING DATA WITH IDENTIFICATION INFORMATION

(71) Applicant: Ricoh Company, Ltd., Tokyo (JP)

(72) Inventor: Baihain Rin, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/983,919

(22) Filed: Dec. 17, 2024

(65) Prior Publication Data

US 2025/0124000 A1    Apr. 17, 2025

Related U.S. Application Data

(63) Continuation of application No. 18/171,960, filed on Feb. 21, 2023, now Pat. No. 12,210,482.

(30) Foreign Application Priority Data

Mar. 18, 2022    (JP) ................................. 2022-044642

(51) Int. Cl.
*G06F 16/14*            (2019.01)
(52) U.S. Cl.
CPC .................................. *G06F 16/148* (2019.01)
(58) Field of Classification Search
None
See application file for complete search history.

(56) References Cited

U.S. PATENT DOCUMENTS 6,564,320 B1 * 5/2003 de Silva ................ G06F 16/148
                                                    707/999.009
8,327,270 B2 * 12/2012 Jones .................... G06F 16/148
(Continued)

FOREIGN PATENT DOCUMENTS

JP        H09-311862        12/1997
JP        H10-198744         7/1998
(Continued)

OTHER PUBLICATIONS

Japanese Office Action for 2022-044642 mailed on Oct. 21, 2025.
Japanese Office Action for JP2022-044642 mailed on Apr. 7, 2026.

*Primary Examiner* — Son T Hoang
(74) *Attorney, Agent, or Firm* — IPUSA, PLLC

(57) ABSTRACT
An information processing terminal, connected with an information processing device, enables viewing data managed in a data management device with ease. The data management device includes: circuitry; and a memory storing executable instructions which, when executed by the circuitry, cause the circuitry to: communicably connect with an information processing terminal and an information processing device via a network; transmit access information to the information processing device, the transmitted access information being used to view data stored in the memory; receive an acquisition request from the information processing device, the received acquisition request being transmitted in response to a user operation performed on the access information in the information processing terminal connected to the information processing device, and being used to acquire the data; and transmit the acquired data to the information processing device based on the access information included in the acquisition request.

8 Claims, 11 Drawing Sheets

(56) References Cited

U.S. PATENT DOCUMENTS

| | | | | |
|---|---|---|---|---|
| 2013/0110910 | A1 | 5/2013 | Ikeda | |
| 2013/0297645 | A1 | 11/2013 | Foresti | |
| 2014/0122306 | A1* | 5/2014 | Fox | G06F 16/14 |
| 2014/0317187 | A1* | 10/2014 | Tsujimoto | G06F 16/93 |
| 2015/0095130 | A1* | 4/2015 | Benjamin | G06F 16/14 |
| 2020/0051095 | A1* | 2/2020 | Kumar | G06F 16/95 |
| 2021/0165844 | A1 | 6/2021 | Maeda | |
| 2021/0266641 | A1* | 8/2021 | Selfors | G06F 16/7867 |
| 2022/0035819 | A1* | 2/2022 | Hisada | G06F 16/2365 |
| 2023/0099520 | A1 | 3/2023 | Rin | |

FOREIGN PATENT DOCUMENTS

| | | |
|---|---|---|
| JP | 2009-86931 | 4/2009 |
| WO | 2012/169379 | 12/2012 |

* cited by examiner

DOCUMENT REGISTRATION GRAPHICAL INTERFACE 1001    1002

Figures 6, 7:
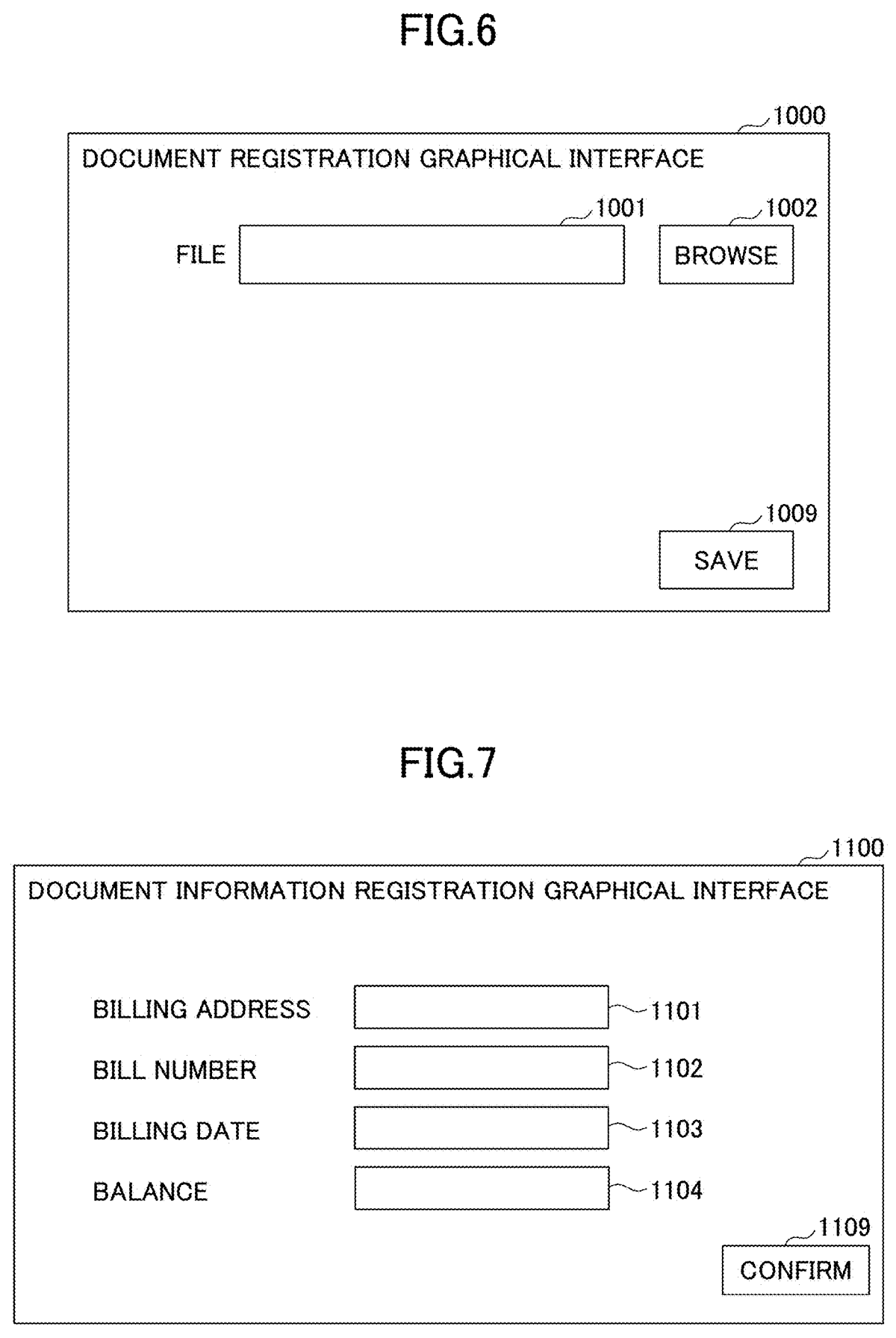

FILE [                    ]    [ BROWSE ]

1009

[ SAVE ]

DOCUMENT INFORMATION REGISTRATION GRAPHICAL INTERFACE

BILLING ADDRESS    [                    ] 1101

BILL NUMBER    [                    ] 1102

BILLING DATE    [                    ] 1103

BALANCE    [                    ] 1104

1109

[ CONFIRM ]

FIG.8

| ORIGINAL COPY ID | BILLING ADDRESS | BILL NUMBER | BILLING DATE | BALANCE |
|---|---|---|---|---|
| ID-A | SAMPLE CO., LTD. | S001 | 2022/1/31 | 291,600 |
| ID-C | ○○○ CO., LTD. | S002 | 2022/1/20 | 56,500 |
| ID-E | ××× CO., LTD. | S003 | 2022/3/15 | 1,234,567 |
| ⋮ | ⋮ | ⋮ | ⋮ | ⋮ |

FIG.9

| ORIGINAL COPY ID | FILE INFORMATION |
|---|---|
| ID-A | ID-A.pdf |
| ID-C | ID-C.pdf |
| ID-E | ID-E.xlsx |
| ... | ... |

FIG.10

| BILLING ID | ORIGINAL COPY ID |
|---|---|
| ID-B | ID-A |
| ID-D | ID-C |
| ID-F | ID-E |
| ... | ... |

START CALCULATION (F5)

| BILLING DATE | APRIL 1, 2021 | ~ | MARCH 31, 2022 |
|---|---|---|---|
| BILL NUMBER | 1 | ~ | 99999 |
| CURRENT TERM | | | |

| BILL NUMBER | BILLING DATE | DATE OF ENTRY | HANDLING PERSON | NUMBER OF ITEMS | LABELED/UNLABELED | HIGHER APPROVER |
|---|---|---|---|---|---|---|
| 1 | AUGUST 31, 2021 | OCTOBER 29, 2021 | PERSON A | 1 | | |
| 5 | OCTOBER 1, 2021 | DECEMBER 6, 2021 | PERSON A | 1 | | |
| 6 | OCTOBER 1, 2021 | DECEMBER 6, 2021 | PERSON A | 1 | | |
| 7 | OCTOBER 1, 2021 | DECEMBER 6, 2021 | PERSON A | 1 | | |
| 8 | OCTOBER 1, 2021 | DECEMBER 6, 2021 | PERSON A | 1 | | |
| 9 | OCTOBER 1, 2021 | DECEMBER 6, 2021 | PERSON A | 1 | | |
| 10 | OCTOBER 1, 2021 | DECEMBER 6, 2021 | PERSON A | 1 | | |
| 11 | OCTOBER 1, 2021 | DECEMBER 6, 2021 | PERSON A | 1 | | |
| 12 | OCTOBER 1, 2021 | DECEMBER 6, 2021 | PERSON A | 1 | | |
| 13 | OCTOBER 1, 2021 | DECEMBER 6, 2021 | PERSON A | 1 | | |
| 14 | OCTOBER 1, 2021 | DECEMBER 6, 2021 | PERSON A | 1 | | |
| 15 | OCTOBER 1, 2021 | DECEMBER 6, 2021 | PERSON A | 1 | | |

| DATA/TIME OF ENTRY/CORRECTION | MONTHLY JOURNAL ENTRY | FINANCE |
|---|---|---|
| DATE/TIME OF DELETION | | |
| BILL DISPLAYED | 1 / 68 | |

| SEAL OF APPROVAL 1 | SEAL OF APPROVAL 2 | SEAL OF APPROVAL 3 | SEAL OF APPROVAL 4 |
|---|---|---|---|
| | | | |

| DEBIT BALANCE | DEBIT JOURNAL ENTRY/AUXILIARY/TAX CLASS/SECTION | SUMMARY | CREDIT JOURNAL ENTRY/AUXILIARY/TAX CLASS/SECTION | CREDIT BALANCE |
|---|---|---|---|---|

CALCULATION IS COMPLETE

[ FINANCE ]

2100

{ DEBIT :
{ CREDIT :

2110

| BILLING DATE | AUGUST 31, 2021 |
| BILL NUMBER | 1 |

| DEBIT BALANCE | DEBIT ITEM/AUXILIARY/ TAX CLASS/SECTION | | SUMMARY | CREDIT ITEM/AUXILIARY/ TAX CLASS/SECTION | | CREDIT BALANCE |
|---|---|---|---|---|---|---|
| | 111 CASH | NOT APPLICABLE | | 150 NOTE RECEIVABLE | NOT APPLICABLE | |
| 55,000 | 000 COMMON SECTION | | ID-A 2111 | 000 COMMON SECTION | | 55,000 |
| | TOTAL | DIFFERENCE | 0 | | | |
| 55,000 | | | | | | 55,000 |

3 / 999

SYSTEM INCLUDING FIRST SERVER AND SECOND SERVER FOR TRANSMITTING DATA WITH IDENTIFICATION INFORMATION

CROSS-REFERENCE TO RELATED APPLICATIONS

This patent application is a continuation application of U.S. Patent Application No. 18/171, 960, filed on Feb. 21, 2023, which is based on and claims priority under 35 U.S.C. § 119 to Japanese Patent Application No. 2022-044642, filed on Mar. 18, 2022, the contents of which are incorporated herein by reference in their entirety.

BACKGROUND OF THE INVENTION

1. Field of the Invention

The present invention relates to a data management device, a data management system, and a recording medium.

2. Description of the Related Art

A document management system for electronically managing data such as documents is in use. Also, a document processing system that performs predetermined processes by using information representing the content of data is in use. Furthermore, there is a technique in which a data management device such as a document management system and an information processing device such as a document processing system are linked, and in which the information processing device performs predetermined processes by using information that represents the content of data managed in the data management device.

A document processing system makes it possible to search for information in a drill-down fashion. For example, as related art, Patent Document 1 discloses an invention that separates between the search process and the definitions of searchable items, so as to enable drill-down search with a higher degree of freedom in the order in which search items are specified.

RELATED-ART DOCUMENT

Patent Document

[Patent Document 1] Unexamined Japanese Patent Application No. HEI9-311862

SUMMARY OF THE INVENTION

However, a problem with the related art is that the procedures for viewing data managed in a data management device from an information processing terminal connected to an information processing device are complex. To do so, the user has to know, in advance, information for accessing the data managed in the data management device, which is inefficient.

In view of the above technical problem, an object of an embodiment of the present invention is to enable an information processing terminal connected to an information processing device to view the data managed in a data management device with ease.

In order to achieve the above object, a data management device according to an embodiment of the present invention includes: circuitry; and a memory storing executable instructions which, when executed by the circuitry, cause the circuitry to: communicably connect with an information processing terminal and an information processing device via a network; transmit access information to the information processing device, the transmitted access information being used to view data stored in the memory; receive an acquisition request from the information processing device, the received acquisition request being transmitted in response to a user operation performed on the access information in the information processing terminal connected to the information processing device, and being used to acquire the data; and transmit the acquired data to the information processing device based on the access information included in the acquisition request.

According to one embodiment of the present invention, an information processing terminal connected to an information processing device can view the data managed in a data management device with ease.

BRIEF DESCRIPTION OF THE DRAWINGS

FIG. 6 is a diagram that shows an example of a document registration graphical interface according to one embodiment;

FIG. 7 is a diagram that shows an example of a document information registration graphical interface according to one embodiment;

FIG. 8 is a diagram that shows an example of document information according to one embodiment;

FIG. 9 is a diagram that shows an example of document meta data according to one embodiment;

FIG. 10 is a diagram that shows an example of billing information meta data according to one embodiment;

FIG. 11 is a diagram that shows an example of a bill list graphical interface according to one embodiment;

DESCRIPTION OF EMBODIMENT

Figure 1:
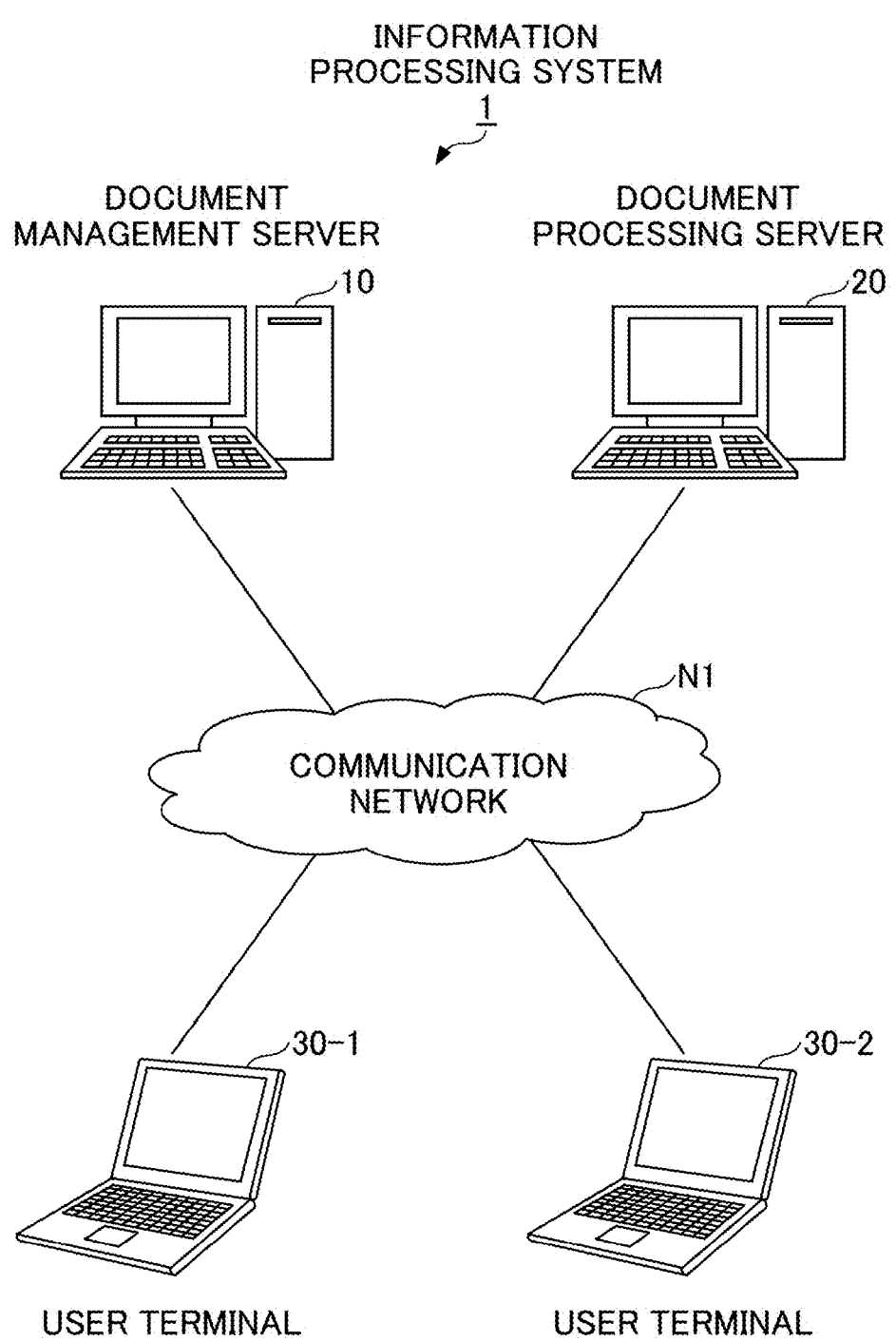
FIG. 1 is a diagram that shows an overall structure of an information processing system according to one embodiment.

Hereinafter, an embodiment of the present invention will be described in detail with reference to the accompanying drawings. Note that, throughout the accompanying drawings, components that have the same function will be assigned the same numerals, and redundant description will be omitted.

Embodiment

An embodiment of the present invention is an information processing system, in which a document management server that manages documents and a document processing server that performs predetermined processes by using information representing the contents of documents (hereinafter also referred to as "document information") can communicate with each other via a communication network.

In the information processing system according to this embodiment, the document management server and the document processing server cooperate. To be more specific, the document processing server performs predetermined processes by using document information that represents the contents of documents managed on the document management server.

A user who performs a process by using a document's information may want to browse the real copy of the document. However, since the document processing server does not hold the real copy of the document, the user needs to search for the document on the document management server.

Meanwhile, the information that is needed to search for a document on the document management server varies depending on the content of the document. Therefore, the user needs to know in advance in which location the information that is needed to search for the document is present.

In the information processing system according to this embodiment, the document management server transmits access information, which is information for accessing the document, to the document processing server, together with document information. The document processing server stores ID information that identifies the document information, and the access information, in advance, in association with each other, and presents the access information to the user terminal by including it in the graphical interface for performing the process using the document information.

The user terminal transmits a request for acquiring the document, to the management server, in response to the operation performed on the access information on the graphical interface. The document management server provides the user terminal with a graphical interface for viewing the document, in response to the acquisition request received from the user terminal.

A "document" according to this embodiment refers to electronic data that represents the content of a document or the like. However, electronic data is by no means limited to documents, and any electronic data to represent, for example, information such as text, images, moving images, and so forth may be used.

The document processing server according to this embodiment is an accounting system that performs accounting processes by using accounting information such as details indicated on bills such as invoices. However, the processes to be performed by the document processing server are by no means limited to accounting processes, and any electronic process that uses information about the contents of documents may be performed.

Overall Structure of Information

First, the structure of the information processing system according to this embodiment will be described with reference to FIG. 1. FIG. 1 is a conceptual diagram that shows an example overall structure of the information processing system according to this embodiment.

As shown in FIG. 1, an information processing system 1 according to this embodiment includes a document management server 10, a document processing server 20, a user terminal 30-1, and a user terminal 30-2.

The document management server 10, the document processing server 20, and the user terminals 30 are each connected to a communication network N1. The communication network N1 is configured such that the devices connected to the communication network N1 can communicate with each other.

The communication network N1 is formed with a wired communication network such as the Internet, a LAN (Local Area Network), or a WAN (Wide Area Network). The communication network N1 is by no means limited to wired communication, and may be formed with a wireless LAN or be based on wireless communication such as short-range wireless communication, or may be formed with a mobile communication network such as WiMAX (Worldwide Interoperability for Microwave Access), LTE (Long Term Evolution), or 5G (5th Generation).

The document management server 10 electronically manages the documents generated on the job. In the document management server 10, meta data is associated and stored with the documents, so that efficient document search is possible. Also, the document management server 10 has a function of executing a workflow for performing jobs to thereby enable, for example, efficient flow of circulation of documents.

The document management server 10 may be implemented by one information processing device, or may be implemented by a plurality of information processing devices.

The document processing server 20 electronically performs predetermined processes by using information representing the contents of documents. The document processing server 20 according to this embodiment performs, for example, accounting processes by using billing information such as details written on bills such as invoices.

The document processing server 20 may be implemented by one information processing device, or may be a system that is implemented by a plurality of information processing devices.

The user terminal 30-1 is an electronic device used by a requesting person, who is a user of the document management server 10. The requesting person can operate the document management server 10 through the user terminal 30-1. The requesting person according to this embodiment is, for example, accounting personnel or the like who handles bills such as invoices to be accounted for by the document management server 10.

The user terminal 30-2 may be an electronic device used by a processing person, who is a user of the document processing server 20. The processing person can operate the document processing server 20 through the user terminal 30-2. The processing person according to this embodiment is, for example, an accountant or the like who performs accounting processes on the document processing server 20 by using billing information such as details written on bills such as invoices.

Computers are examples of the document management server 10, the document processing server 20, and the user terminals 30. Other examples of the user terminals include, for example, image forming devices (a printer, a FAX machine, an MFP (Multifunction Peripheral/Product/Printer: digital multi-function peripheral), a scanner machine, and the like). Note that the document management server 10, the document processing server 20, and the user terminals 30 are not limited to information processing devices or image forming devices, as long as they have communication functions.

The document management server 10, the document processing server 20, and the user terminals 30 may include, for example, a PJ (Projector), an IWB (Interactive White Board: a whiteboard having electronic blackboard functions and capable of mutual communication), an output device such as digital signage, a HUD (Head Up Display) device, an industrial machine, an imaging device, a sound collecting device, a medical device, a network appliance, an automobile (connected car), a laptop PC (Personal Computer), a mobile phone, a smartphone, a tablet terminal, a gaming machine, a PDA (Personal Digital Assistant), a digital camera, a wearable PC, a desktop PC, and so forth.

Hardware Structure of Information

Next, the hardware structure of each device included in the information processing system according to this embodiment will be described with reference to FIG. 2 and FIG. 3.

Computer Hardware Structure

Figure 2:
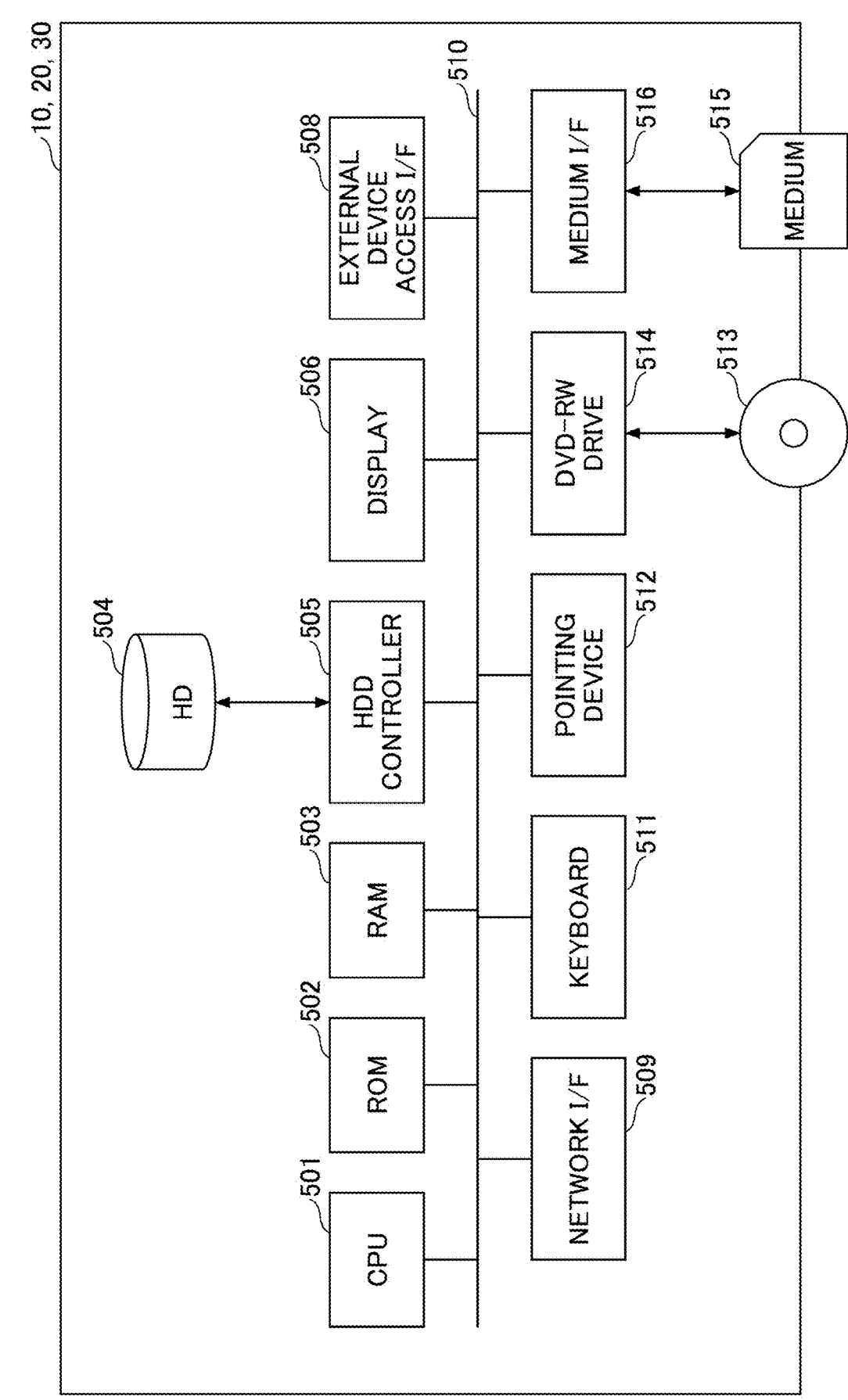
FIG. 2 is a diagram that shows a hardware structure of a computer according to one embodiment.

FIG. 2 is a diagram that shows an example hardware structure in the event the document management server 10, the document processing server 20 and the user terminals 30 are implemented by computers.

As shown in FIG. 2, a computer according to this embodiment has a CPU 501, a ROM 502, a RAM 503, an HD 504, an HDD (Hard Disk Drive) controller 505, a display 506, an external device access I/F (Interface) 508, a network I/F 509, a bus line 510, a keyboard 511, a pointing device 512, a DVD-RW (Digital Versatile Disk Rewritable) drive 514, and a medium I/F 516.

Among these, the CPU 501 controls the overall operation of the computer. The ROM 502 stores the programs used to drive the CPU 501, such as IPL. The RAM 503 is used as a work area for the CPU 501. The HD 504 stores various data such as programs. The HDD controller 505 controls the reading or writing of various data to the HD 504 under the control of the CPU 501. The display 506 displays various information such as a cursor, a menu, graphical interfaces, characters, or images. The external device access I/F 508 is an interface for connecting various external devices. External devices in this case refer to, for example, the USB (Universal Serial Bus) memory, printers, or the like. The network I/F 509 is an interface for communicating data through the communication network N1. The bus line 510 is an address bus, a data bus, or the like, for electrically connecting between each component shown in FIG. 2 such as the CPU 501.

Also, the keyboard 511 is a kind of input means having a plurality of keys for entering characters, numerical values, various commands, and so forth. The pointing device 512 is a kind of input means for selecting and executing various commands, selecting the processing target, moving the cursor, and so forth. The DVD-RW drive 514 controls the reading or writing of various data to the DVD-RW 513 as an example of a removable recording medium. Note that, not only DVD-RW but also DVD-R or the like may be used as well. The medium I/F 516 controls the reading or writing (storage) of data to a recording medium 515 such as a flash memory.

Hardware Structure of MFP

Figure 3:
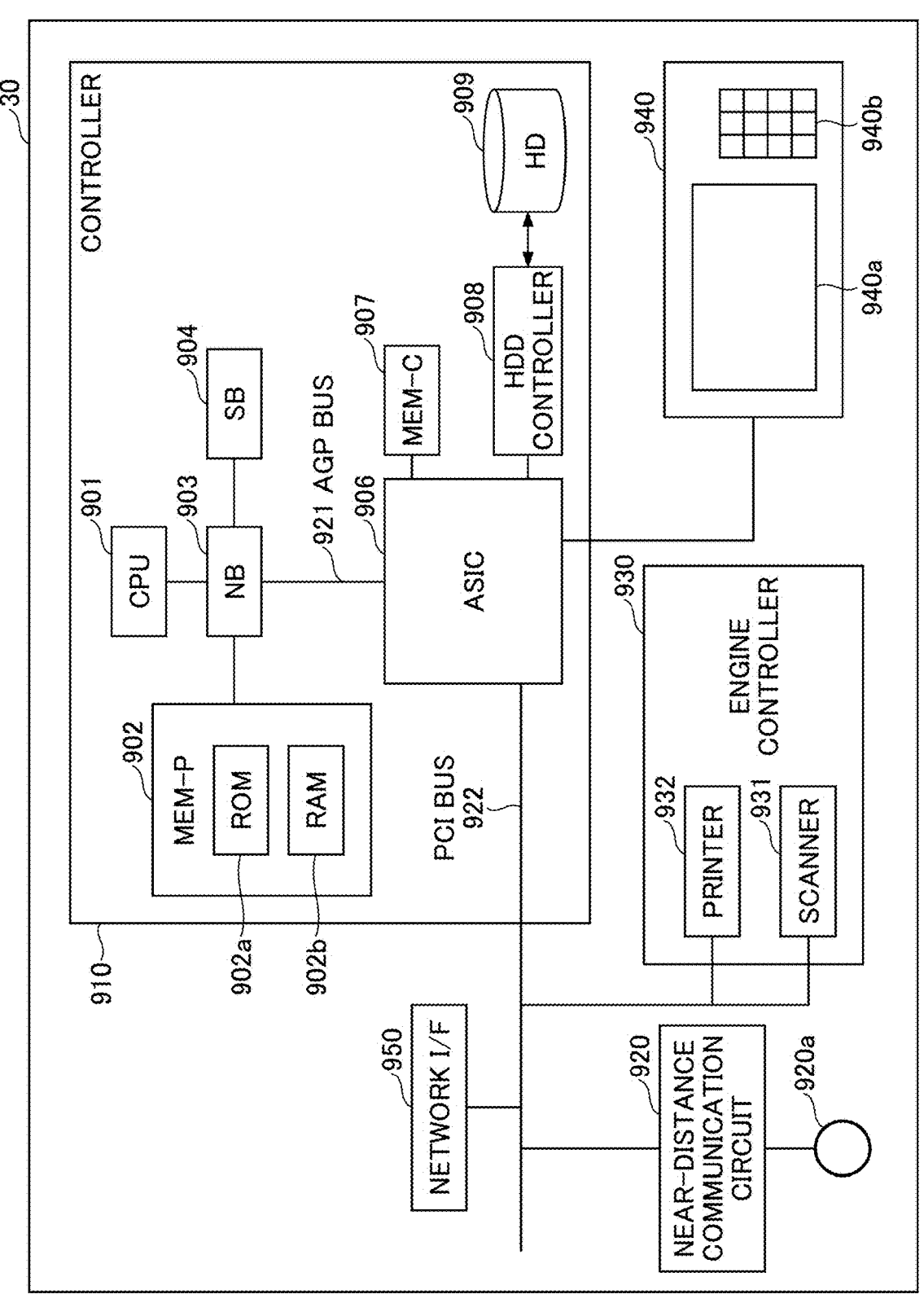
FIG. 3 is a diagram that shows a hardware structure of an MFP according to one embodiment.

FIG. 3 is a diagram that shows an example hardware structure in the event a user terminal 30 is implemented by an MFP. As shown in FIG. 3, an MFP according to this embodiment includes a controller 910, a near-distance communication circuit 920, an engine controller 930, an operating panel 940, and a network I/F 950.

Of these, the controller 910 includes a CPU 901, a system memory (MEM-P) 902, a north bridge (NB) 903, a south bridge (SB) 904, and an ASIC (Application-Specific Integrated Circuit) 906, which are the main parts of the computer, a local memory (MEM-C) 907 and an HDD controller 908, which are memories, and an HD 909, which is a memory, and an AGP (Accelerated Graphics Port) bus 921 which connects between the NB 903 and the ASIC 906.

Among these, the CPU 901 is a controller that has overall control of the MFP. The NB 903 is a bridge for connecting between the CPU 901, the MEM-P 902, the SB 904, and the AGP bus 921, and has a memory controller that controls reading and writing with respect to the MEM-P 902, a PCI (Peripheral Component Interconnect) master, and an AGP target.

The MEM-P 902 is composed of a ROM 902a, which is a memory for storing programs and data for implementing each function of the controller 910, and a RAM 902b, which is used for loading of programs and data, and which is used as a graphics memory upon memory printing, and the like. Note that the programs stored in the RAM 902b may be recorded on a computer-readable recording medium such as a CD-ROM, CD-R, DVD, and so forth, as a file in installable format or executable format, and provided in this fashion.

The SB 904 is a bridge for connecting the NB 903 with PCI devices and peripheral devices. The ASIC 906 is an image processing IC (Integrated Circuit) having hardware elements for image processing, and serves as a bridge that connects between the AGP bus 921, the PCI bus 922, the HDD 908, and the eMEM-C 907. This ASIC 906 consists of the PCI target and the AGP master, an arbiter (ARB) that serves as the core of the ASIC 906, a memory controller that controls the MEM-C 907, multiple DMACs (Direct Memory Access Controllers) that rotate image data using hardware logic and the like, and a PCI unit that transfers data between the scanner 931 and the printer 932 via the PCI bus 922. Note that a USB (Universal Serial Bus) interface, an IEEE 1394 (Institute of Electrical and Electronics Engineers 1394) interface, and so forth may be connected to the ASIC 906 as well.

The MEM-C 907 is a local memory used as an image buffer for copying and a code buffer. The HD 909 is a storage for accumulating image data, accumulating font data used for printing, and accumulating forms. The HD 909 controls the reading or writing of data to or from the HD 909 under the control of the CPU 901. The AGP bus 921 is a bus interface for graphics accelerator cards, proposed to speed up graphics processing, and can speed up the graphics accelerator card by directly accessing the MEM-P 902 with high throughput.

Also, the near-distance communication circuit 920 includes a near-distance communication circuit 920a. The near-distance communication circuit 920 is a communication circuit based on, for example, NFC or Bluetooth.

Furthermore, the engine controller 930 is composed of a scanner 931 and a printer 932. Also, the operating panel 940 has a panel display 940a such as a touch panel for displaying current set values, a selection graphical interface, etc., and for accepting input from the operator, and an operating panel 940b including, for example, a numeric keypad for entering the set values of conditions related to image formation such as the set condition of density, a start key for entering a copy start command, and so forth. The controller 910 controls the entire MFP, and controls, for example, drawing, communication, and input from the operating panel 940. The scanner 931 or the printer 932 includes image processing parts where, for example, error diffusion and gamma conversion are performed.

Note that the MFP can switch and select between the document box function, the copy function, the printer function, and the facsimile function, one by one, by operating an application switching key provided on the operating panel 940. The MFP assumes the document box mode when the document box function is selected, assumes the copy mode when the copy function is selected, assumes the printer mode when the printer function is selected, and assumes the facsimile mode when the facsimile mode is selected.

Also, the network I/F 950 is an interface for communicating data using the communication network N1. The near-distance communication circuit 920 and the network I/F 950 are electrically connected to the ASIC 906 via the PCI bus 922.

Functional Structure of Information Processing System

Figure 4:
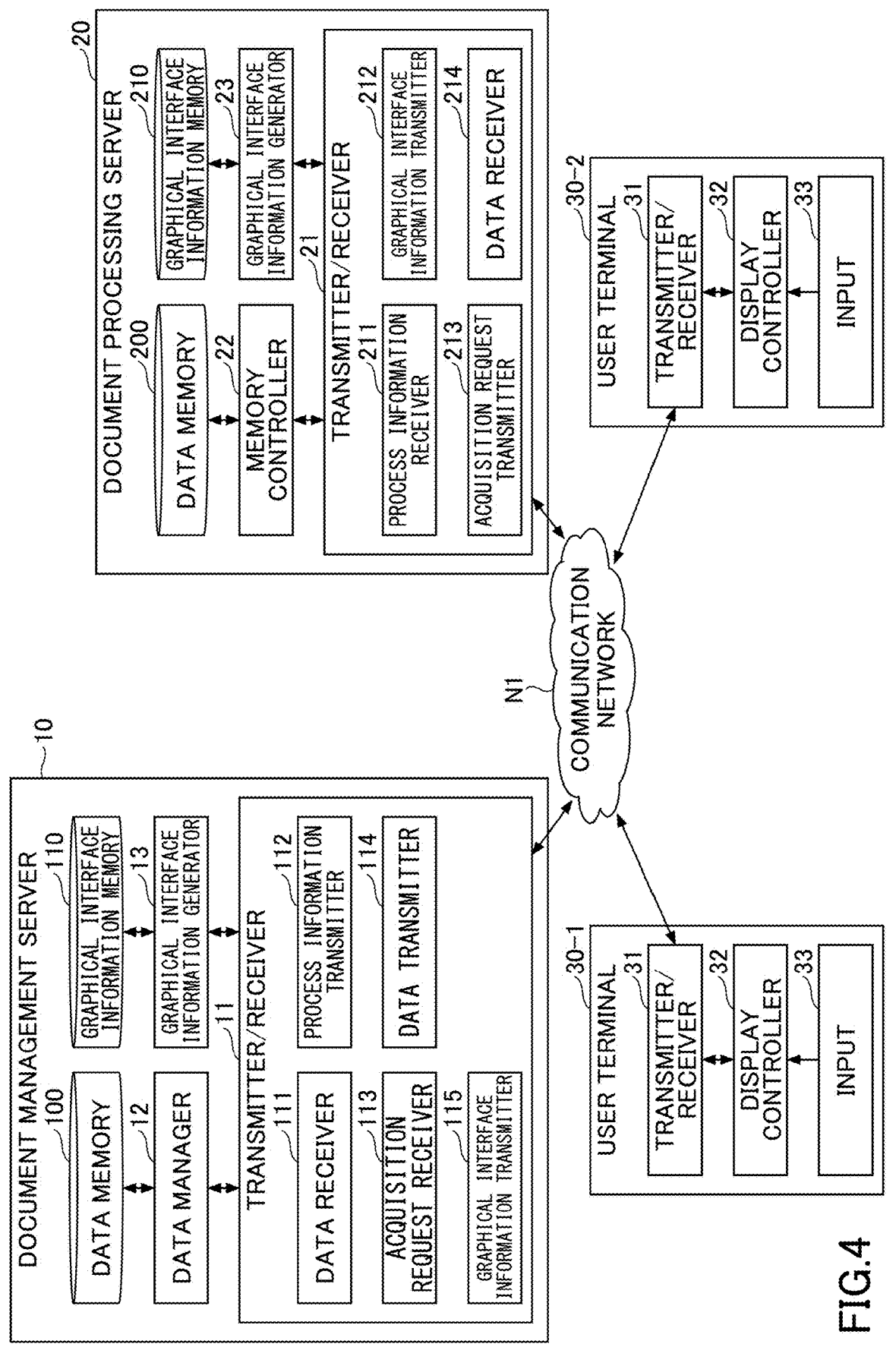
FIG. 4 is a diagram that shows a functional structure of an information processing system according to one embodiment.

Next, an example functional structure of the information processing system according to this embodiment will be described with reference to FIG. 4. FIG. 4 is a block diagram that shows an example functional structure of the information processing system according to this embodiment.

Functional Structure of Document Management Server

As shown in FIG. 4, the document management server 10 according to this embodiment includes a transmitter/receiver 11, a data manager 12, a graphical interface information generator 13, a data memory 100, and a graphical interface information memory 110. The transmitter/receiver 11 according to this embodiment includes a data receiver 111, a process information transmitter 112, an acquisition request receiver 113, a data transmitter 114, and a graphical interface information transmitter 115.

The transmitter/receiver 11 is implemented by, for example, processes that the programs loaded in the RAM 503 from the HD 504 shown in FIG. 2 cause the CPU 501 and the network I/F 509 to perform.

The data manager 12 and the graphical interface information generator 13 are implemented by, for example, processes that the programs loaded in the RAM 503 from the HD 504 shown in FIG. 2 cause the CPU 501 and the HDD controller 505 to perform.

The data memory 100 and the graphical interface information memory 110 are implemented by using, for example, the HD 504 shown in FIG. 2. Reading or writing of data stored in the HD 504 is performed via the HDD controller 505, for example.

The transmitter/receiver 11 transmits and receives various data to and from other servers or terminals via the communication network N1.

The data receiver 111 receives documents and document information from the user terminal 30-1. Also, the data receiver 111 requests the data manager 12 to store the received documents. Furthermore, the data receiver 111 requests the process information transmitter 112 to transmit the received document information.

The process information transmitter 112 transmits document information and access information to the document processing server 20. The document information according to this embodiment is information that is expressed in documents stored in the data memory 100. The access information according to this embodiment is information for accessing documents stored in the data memory 100.

The access information is, for example, ID information (hereinafter also referred to as "original copy ID") that identifies a document in the document management server 10. The access information may also be information (hereinafter also referred to as "storage location information") that indicates the storage location of a document in the document management server 10. To be more specific, the access information may be a link such as a URL (Uniform Resource Locator) that indicates the location of a document in the document management server 10.

Note that the processing information transmission unit 112 can, for example, transmit the document information and the access information to the document processing server 20 via an API (Application Programming Interface) provided by the document processing server 20.

The acquisition request receiver 113 receives, for example, a request for acquiring a document stored in the data memory 100 from the user terminal 30-2. This acquisition request includes access information to the document.

The data transmitter 114 transmits the document specified by the access information that is included in the acquisition request, to the document processing server 20, in response to the acquisition request from the document processing server 20.

The graphical interface information transmitter 115 provides (transmits) graphical interface information that is generated by the graphical interface information generator 13 to the user terminal 30-1 or the user terminal 30-2, in response to a request from the user terminal 30-1 or the user terminal 30-2. The graphical interface information generated by the graphical interface information generator 13 is information to represent the screen/graphical interface for operating the document management server 10.

The data manager 12 manages the documents and meta data stored in the data memory 100. To be more specific, for example, the data manager 12 stores a document that is received from the user terminal 30-1 in the data memory 100. In doing so, the data manager 12 issues an original copy ID that identifies the document, and stores it in the document's meta data, thereby storing the document and the original copy ID in association with each other.

Upon request from the user terminal 30-1 or the user terminal 30-2, the graphical interface information generator 13 generates the graphical interface information to be provided to the user terminal 30-1 or the user terminal 30-2. The graphical interface information generator 13 generates the graphical interface information based on graphical interface information stored in the graphical interface information memory 110 and documents stored in the data memory 100.

The data memory 100 associates and stores the documents and meta data managed in the document management server 10. For example, a document stored in the data memory 100 is an electronic file body that represents the content of the document. Documents are stored in the data memory 100 in a file format in accordance with the file system of the data memory 100. The meta data is stored in a meta data table.

The graphical interface information memory 110 stores the graphical interface information transmitted from the graphical interface information transmitter 115 to the user terminal 30-1 or the user terminal 30-2. Each piece of graphical interface information stored in the graphical interface information memory 110 is, for example, written in HTML (HyperText Markup Language) or the like, and may also include applications written in JavaScript (registered trademark) or the like.

Functional Structure of the Document Processing Server

As shown in FIG. 4, the document processing server 20 according to this embodiment includes a transmitter/receiver 21, a memory controller 22, a graphical interface information generator 23, a data memory 200, and a graphical interface information memory 210. The transmitter/receiver 21 according to this embodiment includes a process information receiver 211 and a graphical interface information transmitter 212.

The transmitter/receiver 21 is implemented by, for example, processes that the programs loaded in the RAM 503 from the HD 504 shown in FIG. 2 cause the CPU 501 and the network I/F 509 to perform.

The memory controller 22 and the graphical interface information generator 23 are implemented by, for example, processes that the programs loaded in the RAM 503 from the HD 504 shown in FIG. 2 cause the CPU 501 and the HDD controller 505 to perform.

The data memory 200 is implemented by using, for example, the HD 504 shown in FIG. 2. Reading or writing of data stored in the HD 504 is performed via the HDD controller 505, for example.

The transmitter/receiver 21 transmits and receives various data to and from other servers or terminals via the communication network N1.

For example, the process information receiver 211 receives document information and an original copy ID from the document management server 10. Also, the process information receiver 211 requests the memory controller 22 to store the received document information and original copy ID.

Upon request from the user terminal 30-2, the graphical interface information transmitter 212 provides (transmits) graphical interface information generated by the graphical interface information generator 23 to the user terminal 30-2. The graphical interface information generated by the graphical interface information generator 23 is information that represents the screen/graphical interface for operating the document processing server 20.

The acquisition request transmitter 213, for example, transmits a request for acquiring a document to the management server 10 in response to a request from the user terminal 30-2. This acquisition request includes the original copy ID selected by the user terminal 30-2.

The data receiver 214 receives the document that is sent from the document management server 10 in response to the document acquisition request. Also, the data receiver 214 requests the graphical interface information generator 23 to generate graphical interface information for an original copy view graphical interface based on the received document.

The memory controller 22 manages the document information and meta data stored in the data memory 200. To be more specific, the memory controller 22 generates the billing information to be processed based on the document information received from the document management server 10, and stores it in the data memory 200. In doing so, the memory controller 22 issues ID information (hereinafter also referred to as "billing ID") that identifies the billing information, and stores the access information in the meta data of the billing information, thereby storing the billing ID and the access information in association with each other.

The graphical interface information generator 23 generates graphical interface information for a bill processing graphical interface and an original copy view graphical interface to be provided to the user terminal 30-2, in response to a request from the user terminal 30-2. The graphical interface information generator 23 generates the graphical interface information of the bill processing graphical interface based on graphical interface information of the bill processing graphical interface stored in the graphical interface information memory 210 and billing information stored in the data memory 200. Also, the graphical interface information generator 23 generates the graphical interface information of the original copy view graphical interface based on graphical interface information of the original copy view graphical interface stored in the graphical interface information memory 210 and the document received from the document management server 10.

The data memory 200 stores the billing information and meta data managed in the document processing server 20.

The billing information is stored in a billing information table. The meta data is stored in a meta data table.

Functional Structure of User Terminal

As shown in FIG. 4, a user terminal 30 according to this embodiment includes a transmitter/receiver 31, a display controller 32, and an input 33.

The transmitter/receiver 31 is implemented by, for example, processes that the programs loaded in the RAM 503 from the HD 504 shown in FIG. 2 cause the CPU 501 and the network I/F 509 to perform.

The display controller 32 is implemented by, for example, processes that the programs loaded in the RAM 503 from the HD 504 shown in FIG. 2 cause the CPU 501 and the display 506 to perform.

The input 33 is implemented by, for example, processes that the programs loaded in the RAM 503 from the HD 504 shown in FIG. 2 cause the CPU 501 and the keyboard 511 or the pointing device 512 to perform.

The transmitter/receiver 31 transmits and receives various data to and from other servers or terminals via the communication network N1.

The display controller 32 displays the graphical interface for operating another server based on graphical interface information received by the transmitter/receiver 31 from that server.

The input 33 receives various operations from the user as input. These operations include an input operation of a file in which electronic data is recorded.

Procedures of Information Processing Method

Figure 5:
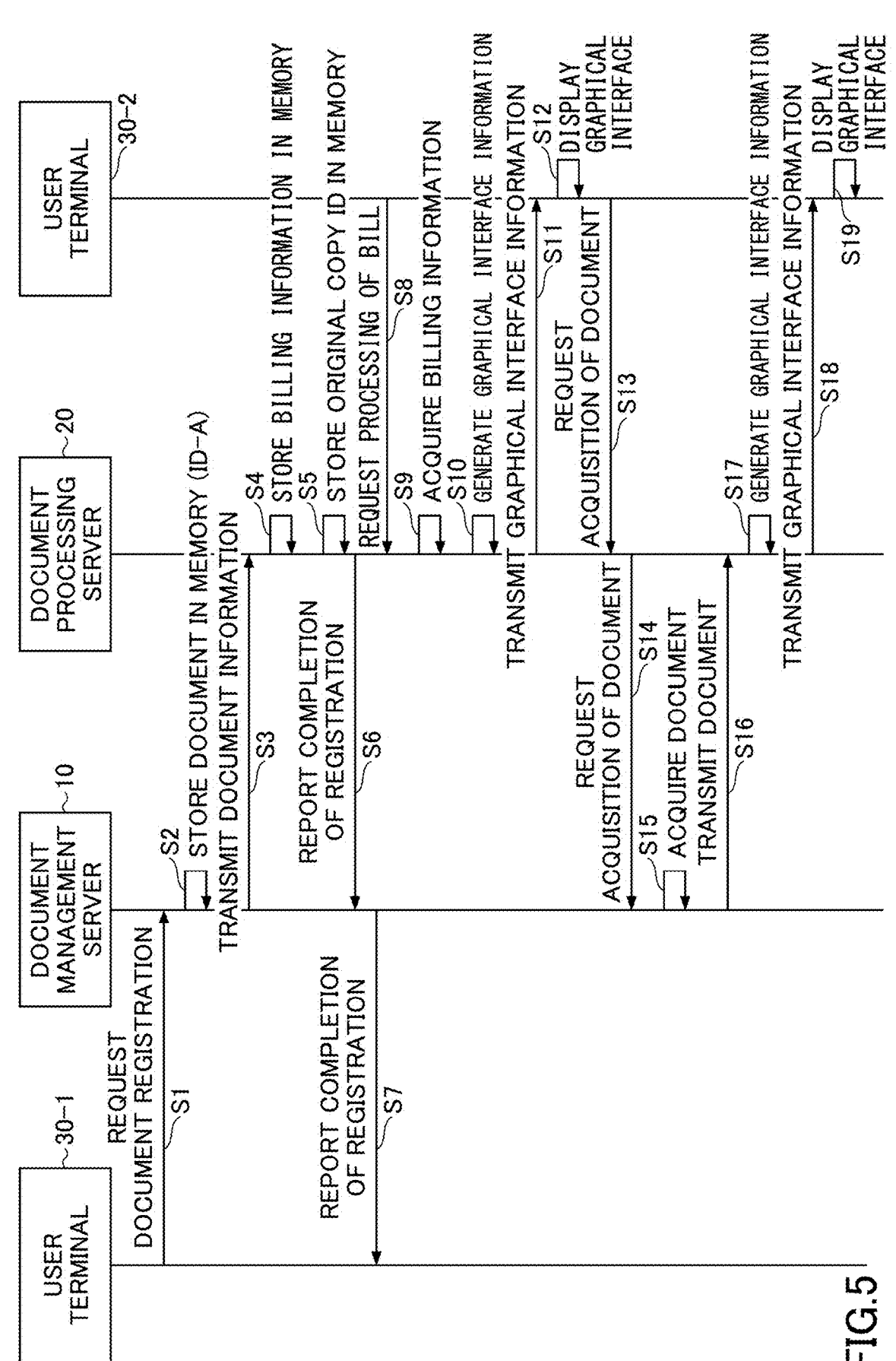
FIG. 5 is a diagram that shows the procedures of an information processing method according to one embodiment.

Next, example procedures of the information processing method performed by the information processing system according to this embodiment will be described with reference to FIG. 5. FIG. 5 is a sequence diagram that shows example procedures of the information processing method according to this embodiment.

In step S1, the display controller 32 of the user terminal 30-1 displays a document registration graphical interface in response to a requesting person's operation. The display controller 32 may authenticate the requesting person before displaying the document registration graphical interface, and display the document registration graphical interface when the authentication is successful. Here, the explanation will be continued assuming that the requesting person is successfully authenticated.

Here, the document registration graphical interface according to this embodiment will be described with reference to FIG. 6. FIG. 6 is a conceptual diagram that shows an example of the document registration graphical interface according to this embodiment.

As shown in FIG. 6, the document registration graphical interface 1000 according to this embodiment includes a file entry column 1001, a browse button 1002, and a save button 1009.

The file entry column 1001 accepts input of information that represents the location of the electronic file corresponding to the document to be registered. The information to represent the location of the electronic file may be an absolute path or a relative path, or may be information that indicates a file on another device, written in URI (Uniform Resource Identifier) format.

When the requesting person presses the browse button 1002, a file selection dialog box is activated. The requesting person can enter input to the file entry column 1001 by selecting a file by using the file selection dialog box.

The document to be registered is a document to be processed by the document processing server 20. The document according to this embodiment is electronic data that represents a bill such as an invoice.

When the requesting person presses the save button 1009, the input 33 receives input of the document specified by the content entered in the file entry column 1001.

Next, the display controller 32 displays the document information entry graphical interface in response to an operation by the requesting person.

Here, the document information registration graphical interface according to this embodiment will be described with reference to FIG. 7. FIG. 7 is a conceptual diagram that shows an example of the document information registration graphical interface according to this embodiment.

As shown in FIG. 7, the document information registration graphical interface 1100 according to this embodiment has a billing address entry column 1101, an invoice number entry column 1102, a billing date entry column 1103, a balance entry column 1104, and a confirm button 1109. Note that the entry columns on the document information registration graphical interface 1100 can be added, changed, or deleted in any way, depending on the particulars of the process.

The requesting person enters the billing address, invoice number, billing date and balance shown on the bill, in the billing address entry column 1101, invoice number entry column 1102, billing date entry column 1103 and balance entry column 1104.

Next, when the requesting person presses the confirm button 1109, the input 33 receives entry of the billing address, invoice number, billing date and amount entered in the billing address entry column 1101, invoice number entry column 1102, billing date entry column 1103 and balance entry column 1104. Subsequently, the input 33 generates document information based on the received billing address, invoice number, billing date, and balance.

Here, the document information according to this embodiment will be described with reference to FIG. 8. FIG. 8 is a diagram that shows an example of document information according to this embodiment.

As shown in FIG. 8, the document information according to this embodiment includes data items such as an original copy ID, billing address, invoice number, billing date, and balance.

Subsequently, the input 33 requests the transmitter/receiver 31 to transmit a registration request for the document and document information that have been received as input. The transmitter/receiver 31 transmits the input document and document information to the document management server 10.

The explanation of FIG. 5 will be resumed now. In step S2, the data receiver 111 of the document management server 10 receives a document and document information from the user terminal 30-1. Next, the data receiver 111 requests the data manager 12 to place the received document in memory. Also, the data receiver 111 requests the process information transmitter 112 to transmit the received document information.

The data manager 12 issues an original copy ID that identifies the received document. Here, assume that "ID-A" is issued as an original copy ID. Next, the data manager 12 stores the issued original copy ID in the received document's meta data. The data manager 12 then stores the document and the meta data in the data memory 100.

Here, document meta data according to this embodiment will be described with reference to FIG. 9. FIG. 9 is a diagram that shows an example of document meta data according to this embodiment.

As shown in FIG. 9, the document meta data according to this embodiment includes an original copy ID, file information, and so forth, as data items. The file information is information that represents the file corresponding to the document. For example, the file information is the file name or an absolute path that indicates the file.

FIG. 9 is an example, and the data items included in a document's meta data can be added, changed, or deleted in any way by the user. Also, depending on the type of document or the state of the process, some of the meta data may not be set.

The explanation of FIG. 5 will be resumed now. In step S3, the process information transmitter 112 of the document management server 10 transmits a document information processing request to the document processing server 20. This processing request includes the document information and the original copy ID.

In step S4, the process information receiver 211 of the document processing server 20 receives the processing request from the document management server 10. Next, the process information receiver 211 requests the memory controller 22 to store the document information and original copy ID included in the received processing request.

The memory controller 22 generates billing information based on the received document information. Next, the memory controller 22 issues a billing ID that identifies the generated billing information. Here, assume that "ID-B" is issued as a billing ID. Next, the memory controller 22 stores the issued billing ID in the meta data of the billing information. The memory controller 22 then stores the billing information and meta data in the data memory 200.

In step S5, the memory controller 22 of the document processing server 20 stores the received original copy ID in the meta data of the billing information. By this means, the billing ID and the original copy ID are associated in the billing information's meta data.

Here, the meta data of billing information according to this embodiment will be described with reference to FIG. 10. FIG. 10 is a diagram that shows an example of billing information meta data according to this embodiment.

As shown in FIG. 10, the meta data of billing information according to this embodiment includes a billing ID and an original copy ID as data items.

FIG. 10 is an example, and the data items included in the meta data of billing information can be added, changed, or deleted in any way by the user. Also, depending on the state of the process, some of the meta data may not be set.

The explanation of FIG. 5 will be resumed now. In step S6, the memory controller 22 of the document processing server 20 requests the transmitter/receiver 21 to transmit a notice of completion of registration. The transmitter/receiver 21 transmits the notice of completion of registration to the document management server 10.

In step S7, the transmitter/receiver 11 of the document management server 10 receives the notice of completion of registration from the document processing server 20. Next, the transmitter/receiver 11 transmits the received notice of completion of registration to the user terminal 30-1.

In step S8, the input 33 of the user terminal 30-2 displays a bill list graphical interface in response to an operation by the processing person. The display controller 32 may authenticate the processing person before displaying the bill list graphical interface, and display the bill list graphical interface when the authentication is successful. Here, the explanation will be continued assuming that the processing person is successfully authenticated.

Here, the bill list graphical interface according to this embodiment will be described with reference to FIG. 11. FIG. 11 is a conceptual diagram that shows an example of the bill list graphical interface according to this embodiment.

As shown in FIG. 11, the bill list graphical interface 2000 according to this embodiment has a bill list display column 2010, a search condition input column 2020, a calculation button 2030, and so forth.

The bill list display column 2010 displays a list of billing information managed in the document processing server 20. By entering search conditions in the search condition entry column 2020 and pressing the calculation button 2030, the billing information displayed in the bill list display column 2010 can be narrowed down to the billing information that matches the search conditions.

When the processing person performs an operation to select a bill in the bill list display column 2010 (for example, by clicking on the billing information displayed in the bill list display column 2010), the input 33 requests the transmitter/receiver 31 to transmit a request for acquiring a bill processing graphical interface. The transmitter/receiver 31 transmits a bill processing graphical interface acquisition request to the document processing server 20. This acquisition request includes the billing ID of the billing information to be processed, selected in the bill list display column 2010.

The explanation of FIG. 5 will be resumed now. In step S9, the transmitter/receiver 21 of the document processing server 20 receives the bill processing graphical interface acquisition request, from the user terminal 30-1. Next, the transmitter/receiver 21 sends the bill processing graphical interface acquisition request to the graphical interface information generator 23.

The graphical interface information generator 23 receives the bill processing graphical interface acquisition request from the transmitter/receiver 21. Next, the graphical interface information generator 23 acquires graphical interface information of the bill processing graphical interface from the graphical interface information memory 210. Also, the graphical interface information generator 23 requests the memory controller 22 to transmit the billing information associated with the billing ID included in the acquisition request.

The memory controller 22 acquires the billing information identified by the billing ID included in the acquisition request, from the data memory 200. Next, the memory controller 22 sends the acquired billing information to the graphical interface information generator 23.

In step S10, the graphical interface information generator 23 embeds the billing information received from the memory controller 22 in the graphical interface information obtained from the graphical interface information memory 210. By this means, the graphical interface information of the bill processing graphical interface to transmit to the user terminal 30-2 is generated.

In step S11, the graphical interface information generator 23 requests the graphical interface information transmitter 212 to transmit the graphical interface information of the bill processing graphical interface. The graphical interface information transmitter 212 transmits the graphical interface information of the bill processing graphical interface to the user terminal 30-2.

In step S12, the transmitter/receiver 31 of the user terminal 30-2 receives the graphical interface information of the bill processing graphical interface from the document processing server 20. Next, the transmitter/receiver 31 sends the received graphical interface information to the display controller 32. The display controller 32 displays the bill processing graphical interface on the display 506 or the like, based on the received graphical interface information.

Figure 12:
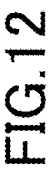
FIG. 12 is a diagram that shows an example of a bill detail graphical interface according to one embodiment.

Here, the bill processing graphical interface according to this embodiment will be described with reference to FIG. 12. FIG. 12 is a conceptual diagram that shows an example bill processing graphical interface according to this embodiment.

As shown in FIG. 12, the bill processing graphical interface 2100 according to this embodiment has a bill detail display column 2110. The bill detail display column 2110 displays the details of the billing information to be processed. Each of the billing information displayed in the bill detail display column 2110 includes an original copy ID display column 2111. The original copy ID display column 2111 displays the original copy ID associated with each billing information.

The explanation of FIG. 5 will be resumed now. In step S13, the input 33 of the user terminal 30-2 receives user operations on the original copy ID display column 2111 in the bill processing graphical interface 2100 (for example, a click on the original copy ID display column 2111). Next, the input 33 requests the transmitter/receiver 31 to transmit a request for acquiring the document. This acquisition request includes the original copy ID displayed in the operated original copy ID display column 2111. The transmitter/receiver 31 transmits the request for acquiring the document to the processing server 20.

In step S14, the acquisition request transmitter 213 of the document processing server 20 receives the document acquisition request from the user terminal 30-2. Next, the acquisition request transmitter 213 transmits the document acquisition request to the management server 10.

In step S15, the acquisition request receiver 113 of the document management server 10 receives the document acquisition request from the processing server 20. Next, the acquisition request receiver 113 sends the received document acquisition request to the data manager 12.

The data manager 12 acquires the document stored in the data memory 100 based on the original copy ID included in the acquisition request. The data manager 12 sends the retrieved document to the data transmitter 114.

In step S16, the data transmitter 114 of the document management server 10 transmits the document received from the data manager 12 to the document processing server 20.

In step S17, the data receiver 214 of the document processing server 20 receives the document from the document management server 10. The data receiver 214 sends the received document to the graphical interface information generator 23.

The graphical interface information generator 23 acquires the graphical interface information of the original copy view graphical interface from the graphical interface information memory 210. Next, the graphical interface information generator 23 embeds the document received from the data receiver 214 in the graphical interface information acquired from the graphical interface information memory 210. By this means, the graphical interface information of the original copy view graphical interface to be transmitted to the user terminal 30-2 is generated.

In step S18, the graphical interface information generator 23 of the document processing server 20 requests the graphical interface information transmitter 212 to transmit the graphical interface information of the original copy view graphical interface. The graphical interface information transmitter 212 transmits the graphical interface information of the original copy view graphical interface to the user terminal 30-2.

In step S19, the transmitter/receiver 31 of the user terminal 30-2 receives the graphical interface information of the original copy view graphical interface from the document processing server 20. Next, the transmitter/receiver 31 sends the received graphical interface information to the display controller 32. The display controller 32 displays the original copy view graphical interface on the display 506 or the like, based on the received graphical interface information.

Figure 13:
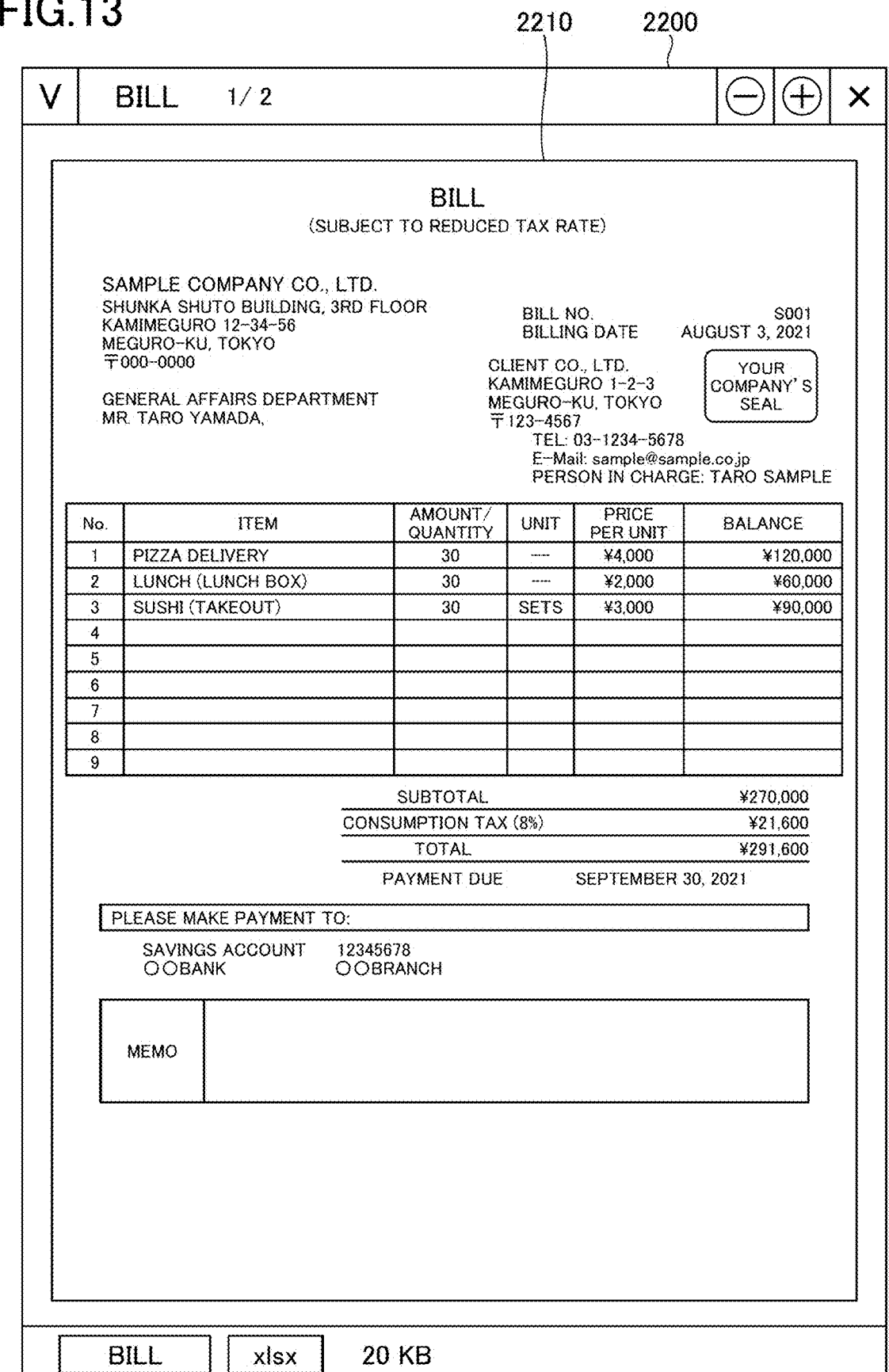
FIG. 13 is a diagram that shows an example of an original copy view graphical interface according to one embodiment.

Here, the original copy view graphical interface according to this embodiment will be described with reference to FIG. 13. FIG. 13 is a conceptual diagram that shows an example original copy view graphical interface according to this embodiment.

As shown in FIG. 13, the original copy view graphical interface 2200 according to this embodiment has an original copy display graphical interface 2210. The original copy display graphical interface 2210 displays the content of the document identified by the original copy ID included in the acquisition request.

Note that, although a structure in which the document processing server 20 provides an original copy view graphical interface to the user terminal 30-2 has been described with this embodiment, it is equally possible to employ a structure in which the document processing server 20 transmits a file that represents an original copy to the user terminal 30-2, and in which the user terminal 30-2 displays the original copy by using general-purpose software that matches the type of the file.

Effects of Embodiment

In the information processing system of this embodiment, the document processing server associates and stores a billing ID that identifies billing information based on document information, with an original copy ID that identifies a document managed in the document management server. The document processing server transmits an acquisition request, including the original copy ID, to the document management server in response to a request from the user terminal. The document processing server provides the user terminal with a graphical interface through which the document received from the document management server may be viewed at the user terminal.

Therefore, according to the information processing system of this embodiment, a graphical interface that the document management server provides to the user terminal allows easy viewing of documents managed in the document processing server. This is efficient because the processing person does not need to know in advance the information to access the documents managed in the document management server.

Modifications

With the above embodiment, an example accounting system has been described in which a document processing server performs accounting processes by using accounting information provided in the form of documents such as invoices. However, the document processing server is by no means limited to document processing, and can perform electronic processing of various types of electronic data.

For example, the information processing system according to the present embodiment can be applied to data analysis processes in the bioinformatics field. In this case, the document processing server provides, for example, the service of analyzing macromolecular proteins.

In this modification, the document processing server in the above embodiment will be referred to as an "information processing device," and the document management server in the above embodiment will be referred to as a "data management device."

The information processing method according to this modification will be described in detail. The user of the service provided by the information processing device registers experimental data related to macromolecular proteins to be analyzed in the data management device. The data management device transmits information representing the content of the experimental data and access information to the experimental data, to the information processing device.

The information processing device transmits graphical interface information used to display the content of the experimental data and the access information to the user terminal. The user performs an operation (for example, clicks on a link displayed on the graphical interface) to select the experimental data to view on the screen provided by the information processing device. The information processing device transmits a request for acquiring the experimental data, to the data management device, in response to a user's operation of the user terminal.

The data management device transmits the experimental data to the information processing device in response to the acquisition request from the information processing device. The information processing device transmits graphical interface information for browsing the experimental data to the user terminal. The user terminal displays a graphical interface for viewing the experimental data according to the graphical interface information.

According to this structure, the information processing device of this modification allows the user to access the experimental data managed in the data management device with ease, through the graphical interface provided by the information processing device to the user terminal.

Notes

In the above-described embodiment, the document management server 10 is an example of a data management device. The document processing server 20 is an example of an information processing device. The information processing system 1 is an example of a data management system. Documents are an example of data. The process information transmitter 112 is an example of an access information transmitter. The process information receiver 211 is an example of an access information receiver.

Each function of the embodiment described above may be implemented by one or more processing circuits. Here, the "processing circuit" according to this specification may refer to a processor that is programmed by software to perform functions, such as a processor implemented by an electronic circuit, or may refer to a device that is designed to perform the herein-described functions, such as an ASIC (Application-Specific Integrated Circuit), a DSP (a digital signal processor), an FPGA (field programmable gate array), a conventional circuit module, and so forth.

The devices described with the above embodiment are simply representative of one of several computing environments for implementing the embodiment described herein. In some embodiments, the document management server 10 and the document processing server 20 may include multiple computing devices, such as a server cluster. These multiple computing devices are configured to communicate with each other over any type of communication link, including a network, a shared memory, and so forth, to perform the processes described in this specification.

Although an embodiment of the present invention has been described in detail above, the present invention is by no means limited to the above embodiment, and various modifications or changes can be made.

What is claimed is:

1. A system comprising:
a first server including first circuitry; and
a second server including second circuitry,
the first circuitry configured to:
   receive data from a first information processing terminal;
   store the data and first identification information identifying the data associated with each other in a memory;
   transmit, to the second server, the first identification information;
   in response to receiving a server request including the first identification information from the second server, transmit, to the second server, the data associated with the first identification information stored in the memory;
the second circuitry configured to:
   receive the first identification information from the first server;
   generate first screen information that displays a graphical interface to receive a user operation for requesting the data;
   transmit the first screen information to a second processing terminal so that the second processing terminal displays the graphical interface based on the first screen information;
   in response to receiving a terminal request transmitted from the second processing terminal, transmit the server request to the first server, the terminal request being sent from the second processing terminal to the second server in response to receiving the user operation on the graphical interface displayed at the second processing terminal, and the server request being sent from the second server to the first server to request the first server to transmit the data;
   receive the data from the first server;
   generate second screen information embedded with the received data; and
   transmit the second screen information to the second information processing terminal.

2. The system according to claim 1, wherein
the second information processing terminal includes third circuitry configured to:
   receive the first screen information and the second screen information;
   display the graphical interface based on the received first screen information;
   transmit the terminal request to the second server requesting the data in response to receiving the user operation on the graphical interface; and
   display the data based on the second screen information.

3. The system according to claim 1, wherein
the first circuitry is further configured to:
   receive the data and input information input by a user from the first processing terminal; and
   transmit the data and the input information to the second server;
the second circuitry is further configured to:
   generate billing data based on the input information; and
   generate the first screen information to display the graphical interface based on the billing data, and
   the graphical interface further includes the billing data.

4. The system according to claim 1, wherein
the terminal request includes the first identification information that identifies the data.

5. The system according to claim 1, wherein
the second circuity is further configured to generate second identification information that identifies the data; and
store the first identification information and the second identification information associated with each other.

6. The system according to claim 1, wherein
the first server is configured to store the data without causing the second server to store the data.

7. The system according to claim 1, wherein
the first screen information displays the graphical interface that includes a search condition input column where a user of the second processing terminal is allowed to input search conditions to search the data stored in the first server.

8. The system according to claim 1, wherein
the second screen information displays a copy of the data received from the first server via the second server.

* * * * *